United States Patent [19]
Hall et al.

[11] 4,172,031
[45] Oct. 23, 1979

[54] SEPARATION OF OIL FROM WATER

[75] Inventors: Richard H. Hall, Midland; Daniel H. Haigh, Sanford; Edwin G. Larson, Midland, all of Mich.

[73] Assignee: The Dow Chemical Company, Midland, Mich.

[21] Appl. No.: 628,619

[22] Filed: Nov. 4, 1975

[51] Int. Cl.² .................................... B01D 15/00
[52] U.S. Cl. .................................... 210/36; 210/40; 210/DIG. 26
[58] Field of Search .......... 210/40, 242 AS, DIG. 26, 210/36, 290, 502–505

[56] References Cited
U.S. PATENT DOCUMENTS

| | | | |
|---|---|---|---|
| 3,520,806 | 7/1970 | Haigh | 210/40 |
| 3,565,257 | 2/1971 | Cavalieri | 210/242 AS |
| 3,567,660 | 3/1971 | Winkler | 210/40 |
| 3,617,551 | 11/1971 | Johnston | 210/40 |
| 3,739,913 | 6/1973 | Bogosian | 210/DIG. 26 |

*Primary Examiner*—Charles N. Hart
*Assistant Examiner*—Ivars Cintins

[57] ABSTRACT

Water containing traces of oil is cleaned by passing through a porous bed containing oleophilic bodies and oil imbibing bodies. Oil is collected on the surface of the oleophilic bodies and removed from the oleophilic bodies by the oil imbibing bodies. Such beds have a high capacity for oil retention while maintaining separating efficiency.

5 Claims, 4 Drawing Figures

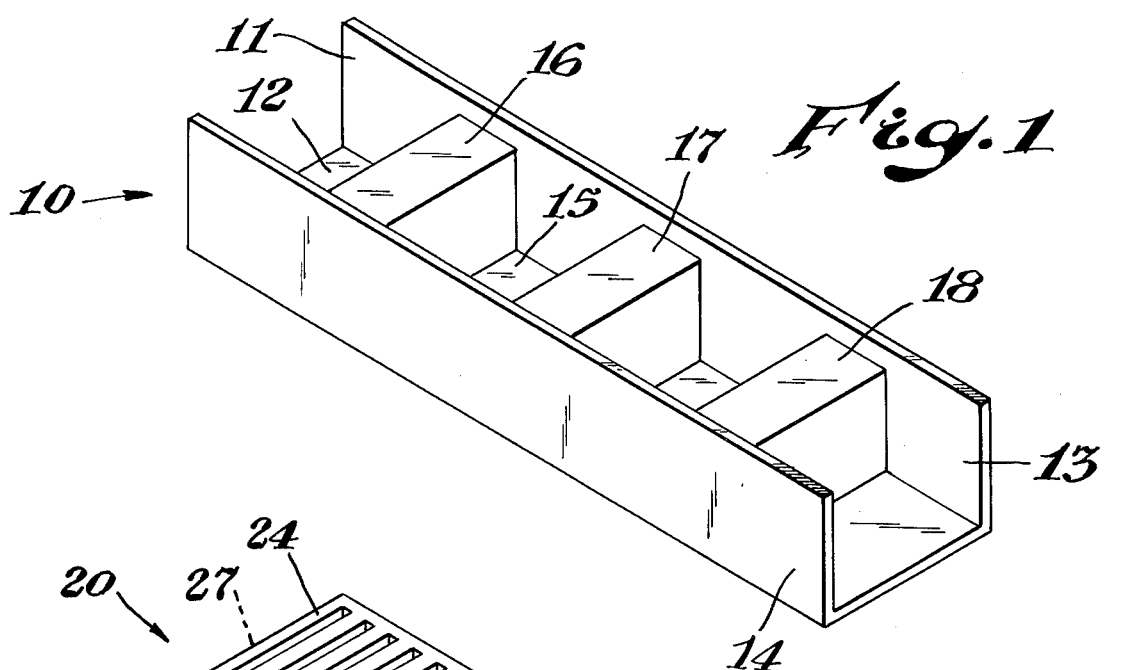
Fig. 1
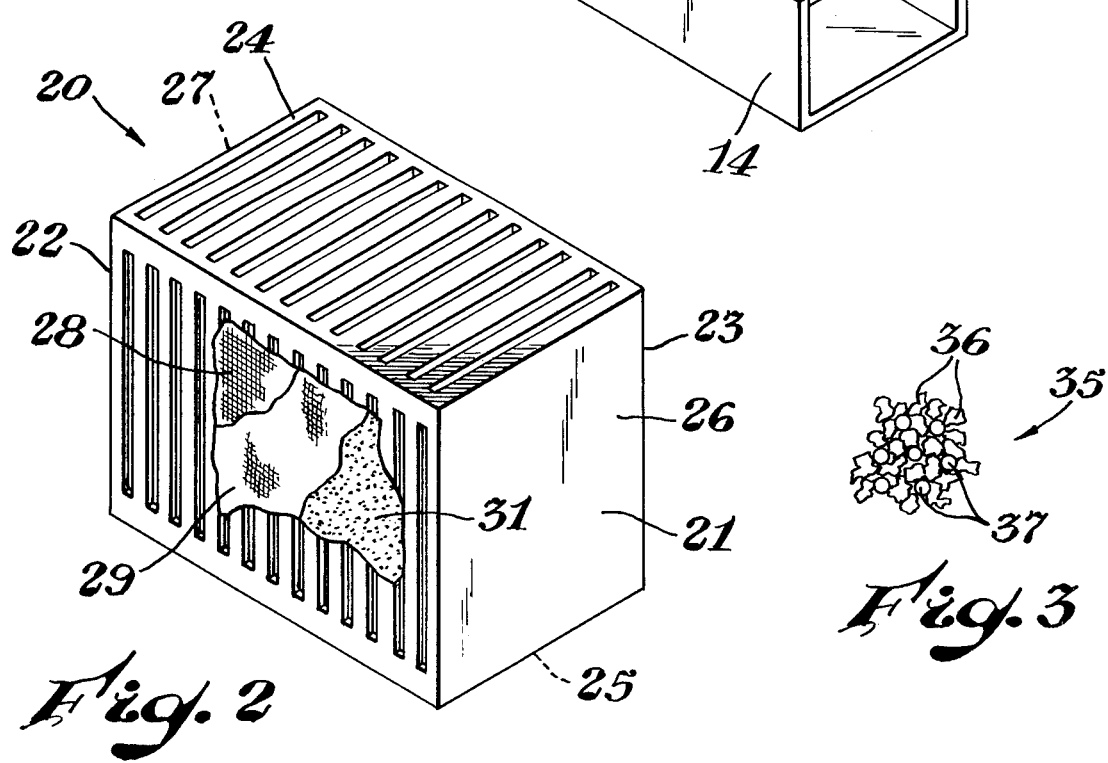
Fig. 2
Fig. 3
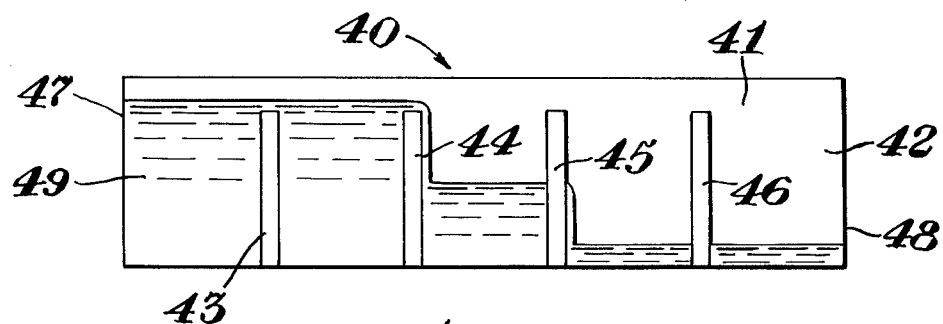
Fig. 4

SEPARATION OF OIL FROM WATER

In many instances, aqueous streams are contaminated with small amounts of oils such as petroleum oils. The oil may be in the stream in the form of minute droplets or microdroplets and/or may appear as a sheen or iridescence on the surface of the stream. Such streams are often treated by passing through American Petroleum Institute separators. Such separators usually employ at their discharge end an elongate rectangular channel having disposed therein at spacec intervals bales of straw interrupting the flow at the upper surface of the water. Oil is sorbed by the straw and when the straw has been saturated with oil, the bales are replaced. Such separators may remove a substantial portion of the oil from the water, however, the effluent from such separators generally contains an undesirable quantity of oil which serves to contaminate the environment. Various other means to separate small quantities of oil from water have been employed. Generally, such techniques are dependent upon the sorption of oil on a treating medium having a relatively high surface area such as activated carbon and the like. Such sorption beds generally decrease in efficiency rapidly and the effective or available surface area decreases as oil is added to the bed.

It would be desirable if there were available an improved method and apparatus for the treatment of aqueous streams containing oil or other water immiscible organic liquid.

It would also be desirable if there were available an improved sorption method for the treatment of aqueous streams containing small amounts of petroleum oil.

It would also be desirable if there were available an improved method and apparatus having a high capacity for petroleum oil sorption from aqueous streams.

These benefits and other advantages, in accordance with the present invention, are achieved in a method for the removal of organic liquids from an aqueous stream, the steps of the method comprising: passing an aqueous stream preferably containing less than 1000 parts per million of an organic liquid through an organic liquid sorbing bed, the sorbing bed comprising at least a first body having an oleophilic surface and a second body of an oleophilic imbibing synthetic resinous polymer, the second body being disposed in close proximity to the first body, the second body capable of imbibing organic liquid accumulating on the surface of the first body.

Also contemplated within the scope of the present invention is an apparatus for the removal of organic liquid from aqueous streams preferably containing not more than 1000 parts per million of organic liquid based on the volume of the stream, the apparatus comprising means defining a stream receiving channel, a first sorption bed transversely disposed in the channel, the first sorption bed being permeable to water and in sealing engagement with means defining the channel whereby water flowing within the channel must flow through the bed and in the event that the bed becomes impermeable, the stream flows over the bed, the bed comprising a first oleophilic surface supporting means having an oleophilic surface, at least one organic liquid swellable synthetic resinous body in contact with the oleophilic surface.

Also contemplated within the scope of the present invention is a water permeable oil sorbing bed, the bed comprising (a) means defining an oleophilic surface (b) an oil swellable synthetic resinous body, the ratio of (a) to (b) by volume being from about 98:2 to about 50:50 with the further limitation that (b) is positioned sufficiently close to (a), that at least a major portion of the oil collecting on the surface of (a) is imbibed by (b).

Further features and advantages of the present invention will become more apparent from the following specification taken in connection with the drawing wherein:

FIG. 1 is a schematic isometric representation of an apparatus in accordance with the invention;

FIG. 2 is a partly-in-section schematic representation of a sorption bed such as is employed in the apparatus of FIG. 1;

FIG. 3 is a schematic fractional representation of a sorption body such as is used in the bed of FIG. 2;

FIG. 4 is a schematic representation of the operation of apparatus such as that of FIG. 1.

In FIG. 1 there is schematically depicted a water treating apparatus in accordance with the present invention generally designated by the reference numeral 10. The apparatus 10 comprises a channel member 11 and the channel member 11 has a generally rectangular configuration, has a bottom 12, a first side 13 and a second side 14. The bottom 12 and sides 13 and 14 define a generally rectangular channel 15 extending from end to end. Disposed within the channel are sorption beds 16, 17 and 18. The sorption beds 16, 17 and 18 are in spaced relationship from each other and each of the beds extends transversely across the channel 15. The beds 16, 17 and 18 are in generally liquid tight sealing engagement with adjacent portions of the body 12 and sides 13 and 14. The beds 16, 17 and 18 extend upwardly from the body 12 to a height less than the height of the sides 13 and 14 and in the event that any one or more of the beds 16, 17 and 18 will no longer permit water to permeate therethrough, the beds 16, 17 and 18 will act as weirs and thus provide a visible indication of bed exhaustion.

In FIG. 2 there is schematically depicted an isometric partially cut-away view of a sorption bed 20 which shows a typical construction of sorption beds such as beds 16, 17 and 18 of FIG. 1. The bed 20 comprises a housing 21 having a first end 22, a second end 23, top 24, a body 25 and first and second sides 26 and 27 respectively. The sides 26 and 27 and body 25 are liquid impermeable and adapted to seal to the walls of a channel such as the channel 15 of FIG. 1. The ends 22 and 23 and top 24 of the housing 21 are perforated to permit the flow of water therethrough. Within the housing 21 is a first bed retainer 28 which advantageously is a heavy wire mesh, perforate metal screen or the like. The first retainer 28 is disposed adjacent the ends 22, 23 and the top 24. A second retainer 29 is disposed immediately adjacent the first retainer and remote from the ends 22, 23 and the top 24. The second retainer 29 beneficially may also be of a metal mesh or screen of substantially smaller mesh size than the retainer 28 and serves to retain a particulate sorbing bed 31.

In FIG. 3 there is depicted a sorbing bed generally designated by the reference numeral 35. The bed 35 comprises a plurality of particles 36, the particles 36 have oleophilic surfaces. Admixed with the particles 36 are a plurality of synthetic resinous particles 37. The particles 37 are capable of imbibing hydrocarbons such as fuel oil, diesel oil and the like in the presence of water. When water containing an imbibable oil is passed through a bed such as the bed 35 or 16, 17, 18 or 20, the oleophilic particles such as the particles 36 tend to adsorb oil on the surface thereof from the aqueous stream. The particles 37 are believed to remove oil from the surface of the particles 36 and in doing so swell and increase in volume thereby maintaining the oleophilic surfaces available for further organic liquid sorbtion. Advantageously, the ratio of oleophilic particles and oil imbibing particles is chosen in such a manner that when the bed has become exhausted, that is has no more, or a relatively small capability of sorbing oil, the bed exhibits a marked reduction of permeability and as desired a complete or an almost complete shut-off of flow through the bed clearly causing filter bed to act as a weir.

In FIG. 4 there is schematically depicted operation of an oil-water separator in accordance with the present invention generally designated by the reference numeral 40. The apparatus 40 has a housing 41 defining a channel in which there is disposed sequentially sorption beds 43, 44, 45 and 46. The housing 41 has an intake end 47 and discharge end 48. A stream 49 is shown flowing through the housing 41 into the intake end 47 and out of the discharge end 48. The stream 47 is flowing over the top of the beds 43 and 44. These beds have been exhausted and the flow has plugged off because of swelling of the oil imbibing beds. The bed 45 has started to plug, that is the lowermost portion exhibits a substantial resistance to flow and the bed 45 is progressively plugging from the bottom-up due to swelling of the oil imbibing particles. The bed 46 permits free passage of the stream 49 as no oil or very little has reached the bed 46. When bed 45 plugs completely and acts as a weir, the beds 43, 44, and 45 should then be replaced with fresh beds uncontaminated with oil.

In the practice of the present invention, a wide variety of material may be employed as the oleophilic component. Particularly desirable are particles prepared by the grinding of synthetic resinous foams such as polyurethane foams, polyolefin foams such as polyethylene foams, polypropylene foams, polybutene foams, polyvinylchloride foams, polybutadiene foams, polyisoprene foams, other rubber foams and the like. Beneficially, in preparing such particles such foams are ground to a point where 90 to 95% of the closed-cell structure has been destroyed and upon microscopic examination of the particles, they appear to be non-planar cell fragments. Other materials useful for the oleophilic adsorbent component include sand, vermiculite, bagasse, straw, sawdust, granular petroleum and wood charcoals or cokes, ground automobile and truck tires, metal shot, glass particles and the like. Beneficially, fibrous oleophilic bodies can be employed with using synthetic or natural fibers of woven or non-woven configuration. Generally, when employing natural fibers, it is usually desirable to coat the fibers with a synthetic resinous coating in order to prevent or delay biological degradation as well as to enhance the wettability by the oil or organic phase.

Swellable polymers useful in the practice of the present invention are any polymers which are water insoluble and which swell on contact with oil or other water insoluble organic liquid. Useful polymers may swell on contact with water. However, additional swelling must occur when contacted with the oil or organic material to be removed. Selection of a polymer for use with any oil or organic liquid is readily accomplished by determining a swelling index for the polymer particles in the particular liquid to be soaked or imbibed. Beneficially, such a swelling index is readily determined by immersing a particulate polymer to be evaluated in water until the polymer has reached equilibrium swelling and subsequently adding the desired oil or organic liquid and determining the volume per unit weight of polymer after a period of 30 minutes with water and oil or other organic liquid and the volume per unit weight of the polymer when in equilibrium with water. The ratio of the volume per unit weight with organic liquid and water provides the swelling index. If the polymer is soluble the swelling index is infinite. If the swelling index is greater than about 1.2 the polymer particles are useful in the practice of the present invention. Beneficially for most applications a swelling index of at least 1.5 and preferably greater than about 3 is desirable. It is critical to the practice of the present invention to employ a crosslinked polymer which swells but does not dissolve. If the polymer swells in the presence of the organic liquid and water it is suitable for the practice of the present invention. However, for most applications it is desirable to employ a polymer which is cross-linked to a sufficient degree that it exhibits a swelling index between about 1.5 and 50 and preferably between about 3 and 50. A wide variety of polymeric materials are employed with benefit. Such polymers include polymers of styrenes and substituted styrenes; polyvinyl chloride copolymers of vinyl chloride such as a copolymer of 60 weight percent vinyl chloride and 40 weight percent vinyl acetate; polymers and copolymers of vinylidene chloride including a copolymer of 75 percent vinylidene chloride and 25 percent acrylonitrile; acrylic polymers such as polymers of methylmethacrylate, ethyl acrylate and the like. In general the chemical composition of the polymers is not critical. The polymers must show significant swelling; that is, at least a 25 percent increase in volume in a period of at least 10 minutes in the organic liquid to which the polymers are required to respond under desired service conditions of temperature and pressure. Particularly advantageous materials which respond to a wide variety of organic liquids are polymers of styrene such as polystyrene and polymers of styrene and divinylbenzene containing up to about 10 weight percent divinylbenzene. For general use with aliphatic and aromatic hydrocarbons, alkylstyrene polymers and copolymers are of particular benefit. Such alkylstyrene polymers swell very rapidly on contact with aliphatic and/or aromatic hydrocarbons. Generally the more rapid the swelling of the polymer the more rapid the shutoff when the organic liquid is contacted. Alkylstyrene polymers and copolymers usually show substantial swelling when in contact with so called Number 2 Diesel oil in less than 1 minute.

Preferably, cross-linked polymers and copolymers of styrenes, and advantageously of tertiary-alkylstyrenes, are utilized as the imbibing agent in the process of this invention. Those alkylstyrenes which can be used to prepare these polymers have alkyl groups containing from four to twenty, and preferably from four to twelve, carbon atoms, such as: tertiary-alkylstyrenes including for example, p-tert-butylstyrene, p-tert-amylstyrene, p-tert-hexylstyrene, p-tert-octylstyrene, p-tert-dodecylstyrene, p-tert-octadecylstyrene, and p-tert-eicosylstyrene; n-alkylstyrenes including for example n-butylstyrene, n-amylstyrene, n-hexylstyrene, n-octylstyrene, n-dodecylstyrene, n-octadecylstyrene, and n-eicosylstyrene; sec-alkylstyrenes including for example sec-butylstyrene, sec-hexylstyrene, sec-octylstyrene, sec-dodecylstyrene, sec-octadecylstyrene, and sec-eicosylstyrene; isoalkyl-styrenes including for example isobutylstyrene, iso-amylstyrene, isohexylstyrene, isooctylstyrene, isododecylstyrene, isooctadecylstyrene, and isoeicosylstyrene; and copolymers thereof.

Especially preferred for use in the practice of the invention are cross-linked copolymers of such alkylstyrenes as heretofore described and an alkyl ester derived from $C_1$ to $C_{24}$ alcohol and acrylic or methacrylic acid or mixture thereof.

Suitable monomers which may be employed as comonomers with the alkylstyrene include such materials as vinylnaphthalenes, styrene, vinyltoluenes, $\alpha$-methylstyrene, ring substituted $\alpha$-methylstyrenes, halostyrenes, arylstyrenes and alkarylstyrenes; methacrylic esters, acrylic esters, fumarate esters and half esters, maleate esters and half esters, itaconate esters and half esters, vinyl biphenyls, vinyl esters of aliphatic carboxylic acids, alkyl vinyl ethers, alkyl vinyl ketones, $\alpha$-olefins, isoolefins, butadiene, isoprene, dimethylbutadiene, acrylonitrile, methacrylonitrile and the like.

It is desirable that the polymers used in the process of the invention contain a slight amount of cross-linking agent, preferably in the range of from about 0.01 to 2 percent by weight. The most efficient imbibition of oil and like organic liquid contaminants occurs when the level of cross-linking agent is less than about 1 percent since this permits the polymers to swell easily and imbibe a substantial volume of the organic material. When organic liquid-contaminated water is percolated through a sorption bed containing 25 volume percent polymer particles, up to 2 percent crosslinking agent is satisfactory because a lower volume of organic material imbibed by the polymer can be tolerated in this type of operation.

Cross-linking agents which can be used in preparing the imbibing polymers suitable for use in the present invention include polyethylenically unsaturated compounds such as divinylbenzene, diethylene glycol dimethacrylate, diisopropenylbenzene, diisopropenyldiphenyl, diallylmaleate, diallylphthalate, allylacrylates, allylmethacrylates, allylfumarates, allylitaconates, alkyd resin types, butadiene or isoprene polymers, cyclooctadiene, methylene norbornylenes, divinyl phthalates, vinylisopropenylbenzene, divinylbiphenyl, as well as any other di- or poly-functional compounds known to be of use as a cross-linking agent in these polymeric vinyl addition compositions. Normally, the polymer containing the cross-linking agent swells with the imbibed organic material. If there is too much cross-linking agent, the imbibition takes an unreasonably long time or the polymer is unable to imbibe a sufficient quantity of the organic liquid to close the interstitial spaces in the bed. If the imbibitional polymer contains no cross-linking agent or too little cross-linking agent, then it will dissolve eventually in the organic material resulting, for example, in a non-discrete, non-particulate mass of polymer-thickened organic liquid which may not effectively stop the flow.

Polymers for the practice of the method of the present invention may be prepared by any convenient technique, either suspension, emulsion or mass polymerization free radical or ionically catalyzed. Generally, the method of preparation is selected to provide polymer in the most convenient form for any particular application. Thus, if it is desired to have free flowing, readily packed beads, generally suspension polymerization is employed to provide a plurality of small beads. If it is desired to obtain a bed having the maximum amount of polymer surface and a relatively high permeability rate toward water carrying oil or other organic liquid, it is oftentimes desirable to employ an emulsion polymerization technique and recover the polymer by spray drying. If it is desired to obtain a body of predetermined configuration, it is oftentimes beneficial to employ a mass polymerization technique wherein a polymer-insoluble diluent is employed. Techniques for the preparation of such porous polymers are disclosed in U.S. Pat. No. 3,322,695, the teachings of which are herewith incorporated by reference. Such porous polymers can also be prepared by either suspension or mass polymerization. Alternately, satisfactory beds are prepared by mass or suspension polymerization with subsequent comminution of the polymer prepared by the mass technique. The particle size of such polymers is selected in accordance with the desired application, larger particles being employed for deep, high permeability beds, smaller particles for high adsorption and lower permeability. For most applications such particles are from about 0.1 to 5 millimeters in diameter. Alternately, porous polymer beds may be polymerized in desired shapes in the manner of U.S. Pat. No. 3,322,695 or incorporated in an open cell polyurethane foam matrix.

In preparing sorption beds in accordance with the present invention it is generally desirable that the proportion of oil imbibing polymer and the oleophilic material be maintained at such a level that when the oil imbibing polymer has imbibed something approaching the maximum amount of oil which can be imbibed by the polymer that the permeability of the bed would be markedly reduced or reduced to about zero thus providing a visible indication that the bed is exhausted and should be replaced. Polymer particles which are oil or organic liquid imbibing and have a swelling index from about 20 to 40, the oil imbibing particles are employed at a level from about 2 to 25 volume percent of the total volume of the oil imbibing polymer and the oleophilic particles. Higher proportions of oil imbibing polymer may be employed but generally the bed will become impermeable to water flow before all of the oil imbibing capacity of the bed has been used. If less than about two volume percent of oil imbibing polymer is used, the oil sorbing properties of the bed are undesirably low.

By way of further illustration 2 beds were prepared, each measuring inside approximately 4 by 4 by 24 inches. Then beds were oriented with the 24 inch dimension extending vertically. The beds were arranged generally as depicted in FIG. 1. The beds were filled with a mixture of 20 percent by volume of an imbibing lightly crosslinked tertiary-butylstyrene polymer in the form of small beads having a diameter of about 0.75 millimeters and 80% by volume of a mixture of 50 parts by volume of ground flexible polyurethane foam and 50 parts by volume of ground polyethylene foam. Both foams were ground to pass through a mesh having an opening of 0.500 inch. Water was pumped to the inlet side of the beds at a rate of about 100 gallons per hour over a period of 10 hours. During this time, oil was fed to the beds at a rate of 100 milliliters per hour and was mechanically mixed with the water prior to flowing into the beds. The oil was dyed red employing a small unmeasured quantity of Du Pont oil red dye. A total of 900 milliliters of oil were fed intermittently over a period of 10 hours and no visible sheen could be detected in the effluent from the beds. The aqueous effluent had no odor of oil nor could any oil be tasted in the effluent.

In a further illustration two beds were prepared having the dimensions set forth in a previous illustration. Each of the beds contained 7½ percent by volume of polytertiarybutyl styrene cross-linked with 0.05 weight percent divinyl benzene. The polytertiarybutyl styrene was in the form of beads having a diameter of about 300 microns. 92.5 volume percent of the bed was ground polyethylene foam. The polyethylene foam had the form of irregular shards measuring about one-half inches by one-quarter inches. The ground polyethylene foam was ground in water in a high-speed kitchen blender. The resultant shards were primarily of open-cell configuration. The polytertiarybutyl styrene beads and ground foam were imtimately mixed and positioned within the beds. The beds were open on opposite sides with openings measuring three and one-half inches by twenty-four inches. The open sides of the beds were covered with stainless steel screen 12 mesh U.S. sieve size. The beds were arranged generally as depicted in FIG. 1 and water was passed through the beds at a rate of about 103 gallons per hour. The water prior to entering the beds was mixed with No. 2 Diesel oil which was dyed with a small unmeasured quantity of Du Pont oil red. The water-oil mixture was passed through the bed for a period of 485 minutes. As the mixture of oil and water passed through the bed, the lower portion of the bed became red and the water level on the inlet side of the bed moved upwardly as the bed changed in color. At the end of 485 minutes, the water level had risen to the top of the first bed and flowed over the top indicating exhaustion of the first sorption bed. The effluent from the beds showed no color change and no oil could be detected by taste, odor or sheen on the water. The first bed sorbed a total of 808 milliliters of fuel oil.

For purposes of comparison, the foregoing illustration was repeated employing 100 percent ground polyethylene foam in sorption beds instead of a mixture of foam and imbibing beads. The rate of flow of water was 103 gallons per hour and the oil flow rate was 100 milliliters per hour. In a period of less than two hours, oil was passing through the bed. There was no indication of any significant rise in the water level on the input side of the beds and the quantity of oil in the effluent was equal to the quantity of oil fed to the beds.

Similar beneficial results are obtained when the ground foam is replaced by polystyrene fibers and fuel oil of low aromatic content is admixed with the water.

Similar beneficial results are achieved when the ground foam component employed is ground closed-cell polyurethane, ground open-cell polyurethane foam, ground polyvinyl chloride sponge, and ground polypropylene foam. Ground plastic foams alone are effective in removing a quantity of oil from an aqueous stream; however, the capacity of the bed is greatly increased by utilizing particles which imbibe oil collected on the surface of the foam in the manner of the foregoing illustrations.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the removal of organic liquids from an aqueous stream, the steps of the method comprising passing an aqueous stream containing less than 1000 parts per million of an organic liquid through an organic liquid sorbing bed, the sorbing bed comprising at least a first body having an oleophilic surface and
   a second body of an oleophilic imbibing synthetic resinous crosslinked polymer, the second body swelling in but not dissolving in the organic liquid, the second body being disposed in close proximity to the first body, the second body capable of imbibing organic liquid accumulating on the surface of the first body.

2. The method of claim 1 wherein the first body is a ground synthetic resinous foam.

3. The method of claim 1 wherein the oil imbibing synthetic resinous polymer is present in the form of a plurality of beads.

4. The method of claim 1 wherein the first body comprises ground synthetic resinous foam and the second body a plurality of beads.

5. The method of claim 1 including a plurality of sorbing beds disposed within the stream, the stream passing through each of said sorbing beds.

* * * * *